Figure 1:
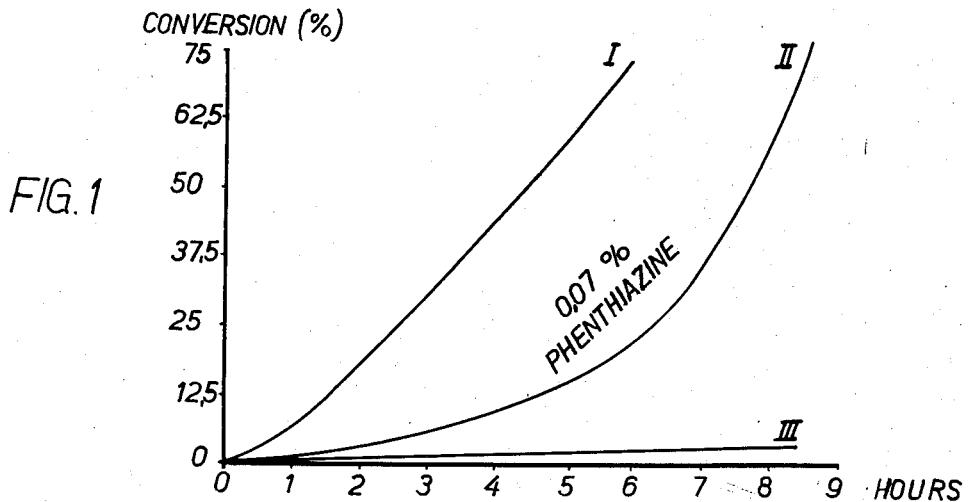

Jan. 10, 1961 E. ROOS ET AL 2,967,851
DIAZO CATALYSTS FOR THE POLYMERIZATION OF CHLOROPRENE
Filed March 25, 1958

INVENTORS:
ERNST ROOS  DIETRICH ROSAHL
BY
ATTORNEYS

United States Patent Office 2,967,851
Patented Jan. 10, 1961

2,967,851

DIAZO CATALYSTS FOR THE POLYMERIZATION OF CHLOROPRENE

Ernst Roos, Leverkusen, and Dietrich Rosahl, Koln-Stammheim, Germany, assignors to Farbenfabriken Bayer Aktiengesellschaft, Leverkusen, Germany, a corporation of Germany Filed Mar. 25, 1958, Ser. No. 723,880

Claims priority, application Germany Mar. 30, 1957

10 Claims. (Cl. 260—45.9)

The present invention relates to an improved and efficient process for the polymerization and copolymerization of chloroprene-(2-chlorobutadiene-1,3) in the presence of catalysts.

Monomer chloroprene shows an extremely ready tendency to polymerize so that handling, transport and storage thereof are particularly difficult. It is consequently necessary to protest the monomeric product from incontrollable polymerization by adding stabilizers which must be removed prior to the polymerization, either by distillation or by other processes, or by the stabilizing action thereof must be eliminated by adding activators. Antioxidants are mainly used as stabilizers for this purpose, these being aromatic hydroxy compounds and amino compounds or their derivatives. Phenothiazine, p-t-butyl pyrocatechol, bis-(2-hydroxy-3-tert.-butyl-5-methyl-phenyl)-methane, bis-(2-hydroxy-3-cyclohexyl-5-methyl-phenyl)-methane, alkyl phenol sulphides or alkylated diphenylamines have inter alia proved satisfactory for this purpose.

Chloroprene stabilized with these compounds can no longer be activated for polymerization purposes with the usual quantities of the peroxide compounds normally employed as polymerization activators.

For example with chloroprene which is stabilized with phenothiazine, the simultaneous use of peroxide compounds and coactivators leads to less satisfactory results, since slight fluctuations in the stabilizer content, such as are caused, for example by a partial inactivation of the stabilizer during storage or during transport, lead to great variations in polymerization velocities, this making it considerably more difficult for polymerization to be carried out continuously. The fluctuations in the content of stabilizer, which cause these differences in the polymerization velocity, are below the limit which can be determined by analysis. Consequently, it is frequently necessary for the monomeric chloroprene to be freed by distillation from the stabilizers prior to being polymerized with peroxide compounds.

In accordance with the present invention it has been found that the aforesaid difficulties can be avoided when using as catalysts in the polymerization of chloroprene and copolymerization of chloroprene with compounds containing one or more carbon-to-carbon double bonds, α-diazo-carboxylic acid esters and/or α-diazo-β-diketones of the general formula

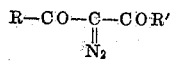

wherein R and R' stand for alkyl, isoalkyl, alkoxy, cycloalkoxy-, aralkoxy-, cycloalkyl-, arakyl- or aryl-radicals, the alkyl groups preferably containing 1–10 carbon atoms.

Suitable compounds of this type are for instance the esters of the alpha-diazoaceto-acetic acid, alpha-diazo-propionyl-acetic acid, alpha-diazo-butyryl-acetic acid, alpha-diazobenzoyl-acetic acid, alpha-diazophenyl-acetoacetic acid, alpha-diazo-perhydrobenzoyl acetic acid with methanol, ethanol, propanol, iso-propanol, butanol, iso-butanol, sec. butanol, decanol, benzylalcohol, cyclohexanol, 2-methylcyclohexanol, furthermore the diesters of the alpha-diazo malonic acid with the aforementioned alcohols, the alphadiazo derivatives of acetylacetone, propionylacetone, butyrylacetone, benzoylacetone, dibenzoyl methane, dipropionyl methane, bis-(phenylacetyl) methane, bis-(perhydrobenzoyl) methane. The preferred compounds are the lower alkylesters of the alpha-diazoaceto acetic acid and the alpha-diazo-acetylacetone.

The compounds proposed as catalysts according to the invention are produced by conventional processes which are described for instance by L. Wolff, Ann. 325 (1902), page 134; L. Wolff, Ber. 36 (1903), page 3612; H. Staudinger, Ber. 49 (1916), pages 1897, 1986; G. Schroeter, Ber. 49 (1916), page 2738.

As compared with the polymerization of stabilized chloroprene with peroxide or persulfate compounds, the process of the invention offers the advantage that the use of coactivators can be dispensed with, that influences resulting from varying proportions of the stabilizer are minimized, that the quantities of activator to be used according to the invention are substantially below the quantities of persulfate or peroxide compounds and that the color of the products obtained by the herein described process is substantially lighter even if the products contain large quantities of stabilizers. Besides, exposure to light generally gives rise to a slight yellow discoloration only, whereas the color of polymers produced with persulfate or oxygen as activators is considerably shifted to brown or brown-red.

As compared with azonitriles which have previously been used as polymerization activators, the diazo compounds to be used according to the invention show the advantage that, when applied at a relatively low proportion, they initiate polymerization very soon already within a low temperature range, viz. at 40–50° C., they increase the polymerization velocity and lead to the formation of physiologically harmless decomposition products.

Besides, the products produced at lower temperature show a mean crystallization tendency which is welcome for a number of applications. However, non crystallizing polymers can be produced at higher polymerization temperatures or by the application of suitable copolymerization components.

The polymerization is preferably carried out in aqueous emulsion, using the known emulsifiers and other additives, such as for example regulators. For example 100 parts of monomer can be used to 80 to 800 preferably 80 to 250 parts of water. The quantity of catalyst is preferably in the range of about 0.005 to 2% by weight, the quantity of emulsifiers in the range of about 1 to 10% and the quantity of regulator in the range of about 0.1 to 2% by weight of the monomers used. If the chloroprene is polymerized or copolymerized in the presence of antioxidizing agents, these can be used in quantities of about 0.01 to 3%. The pH value of the emulsion mixtures can fluctuate within wide limits, but pH values from 7 to 12, preferably 9 to 12 have proved to be particularly suitable. The polymerization of the said monomers takes place at temperatures of about 40° C., but can be carried out at higher temperatures up to about 110° C. The polymerization is generally terminated after obtaining conversions of about 60 to 90%, by cooling the mixtures to room temperature and/or removing the monomer by steam. It is moreover also possible for the polymerization of the said monomers to take place in bulk, solution or suspension according to methods known per se.

Suitable emulsifiers are for instance alkali metal or ammonium salts of sulfonic acids, such as paraffin sulfonic acids, sulfonated succinic esters, alkylated naphthalene sulfonic acids, sulfates of higher fatty alcohols, rosin and rosin derivatives, furthermore quaternary ammonium salts such as lauryl pyridinium chloride, alkali metal salts of fatty acids.

The anti-oxidizing agents which may be used to stabilize the chloroprene are compounds well known in the rubber art where they are added to rubber art where they are added to rubber to prevent its oxidative degradation. These compounds are aromatic hydroxy and amino compounds or derivatives thereof. The aromatic hydroxy compounds include pyrocatechol, hydroquinone, alkylated and styrolized phenols, pyrocatechol and hydroquinone such as p-t-butyl pyrocatechol, p-hydroxydiphenyl, bis-[hydroxyphenyl] methanes and alkylated derivatives thereof such as bis-(2-hydroxy-3-tert.butyl-4-methylphenyl) methane, bis-(2-hydroxy-3-cyclohexyl-5-methylphenyl) methane, aminophenols, e.g. p-aminophenol. Suitable amines are primary and secondary aromatic amines such as p,p'-diaminodiphenylmethane, diphenylamine, styrolized diphenylamines, phenyl-alpha-naphthylamine phenothiazine and derivatives thereof.

Compounds with a single ethylenic double bond and also those with several such bonds, such as for example conjugated dienes having 4 to 6 carbon atoms as for instance butadiene, isoprene, dichlorobutadiene, aromatic compounds containing at least one vinyl group such as styrene, esters of acrylic and methacrylic acid with monohydric saturated alcohols such as methanol, ethanol, propanol, butanol, furthermore vinylidenechloride, are to be considered as co-polymerization components for carrying out the above process. These components are applied in smaller quantities than the chloroprene preferably in amounts of 0.5 to 20% by weight as based on the total monomers.

Moreover, it is possible to carry out the polymerization or copolymerization of the said monomers in block, solution or suspension.

The present invention is further illustrated by the following examples without being restricted thereto, the part being given by weight.

EXAMPLE 1

Fig. 1 of the accompanying drawing illustrates the conversions obtained at time intervals with polymerization mixtures containing a persulfate catalyst.

100 parts of the monomeric chloroprene containing 0.4 part of n-dodecylmercaptan and phenthiazine in quantities of 0.05% (curves I), 0.07% (curves II), 0.08% (curves III), are emulsified with a solution of 4 parts of the sodium salt of disproportionated abietic acid, 0.9 part of the sodium salt of naphthalene sulfonic acid formaldehyde condenzate, 0.9 part of sodium hydroxide and 0.45 part of potassium persulfate in 150 parts of water, and polymerized in the autoclave at 50° C. with stirring. Polymerization is stopped by addition of 0.1% of phenthiazine.

It has been found that mixtures containing more than 0.07% of phenthiazine cannot be polymerized. When phenthiazine is present in lower quantities than the aforesaid amount, variations of the phenthiazine content of 0.005% considerably influence the polymerization velocity.

EXAMPLE 2

Figure 2:
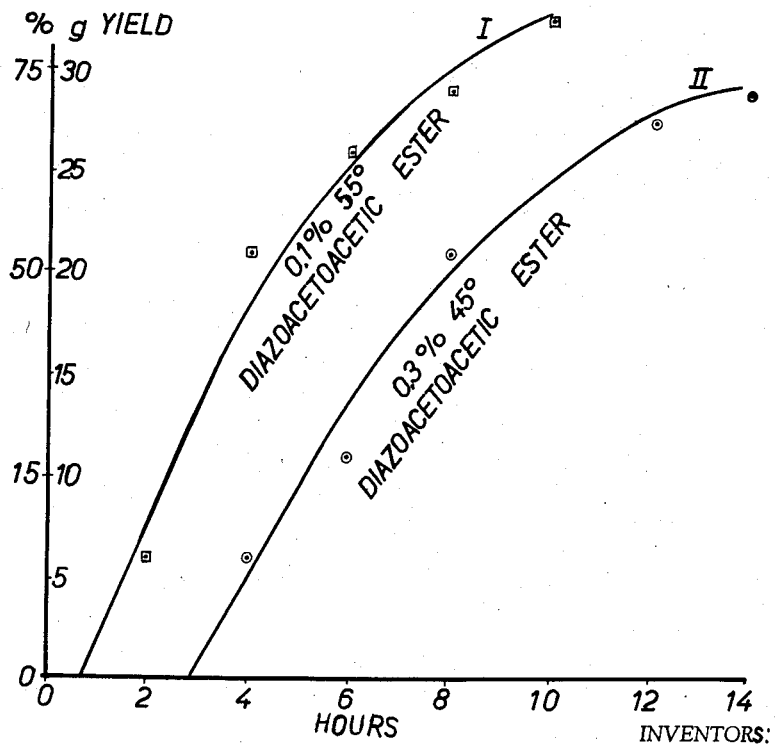

When increasing the amount of phenthiazine, e.g. up to 0.2%, the mixture of Example 1 polymerizes at high velocity of diazoaceto-acetic ethyl ester is used as catalyst instead of 0.45% of potassium persulfate. Fig. 2 illustrates the polymerization procedure of such mixtures at varying temperatures. The amounts of activator used and the polymerization temperature are 0.1% and 55° C. respectively in respect of the mixture represented by curves I, and 0.3% and 45° C. in respect of the mixture represented by curves II.

EXAMPLE 3

In the manner described in Example 1, a mixture stabilized with 0.2% of phenthiazine is polymerized at 55° C. in the autoclave with the addition of 0.1% of diazoacetylacetone as catalyst instead of potassium persulfate. Whereas no polymerization is initiated by the presence of potassium persulfate as activator, polymerization of the mixture is readily secured by addition of the said diazo compounds.

EXAMPLE 4

The following Table I shows the crystallizability of the polymers (I) prepared with diazoaceto acetic ethyl ester at different temperatures, as compared with products (II) prepared with azodiisobutyric acid dinitrile. The Defo value of an unvulcanized mixture of the following composition:

|  | Parts |
|---|---|
| Polymeric chloroprene | 100 |
| Antioxidant (phenyl-α-naphthylamine) | 2 |
| Magnesium oxide (light) | 4 |
| Active zinc oxide | 3 |
| Inactive carbon black | 30 |
| Paraffin | 0.6 |
| Stearic acid | 1 |
| Vulcanization accelerator | 0.5 | were measured after storage for different periods of time. The above Defo values of the unvulcanized mixture on storage at room temperature are a measure for the crystallizability of the crude material. The table shows that the mixtures (I) activated with diazoacetoacetic ester at 50° C. yield polymers which crystallize at room temperature at a substantially higher velocity than the products (II) prepared with azo-diisobutyric-acid-nitrile. (II) At higher temperatures (60° C.) polymers having a slight crystallizing capacity are obtained with diazo-aceto-acetic ester.

*Table I*

DEFO VALUES OF THE UNVULCANIZED MIXTURE

| Mixture | Polymerization temperature, degrees | Storage at room temperature after— | | |
|---|---|---|---|---|
| | | 0 days | 7 days | 14 days |
| I | 65 | 1,125 | 2,000 | 2,000 |
| | 50 | 900 | 5,500 | 7,500 |
| II | 60 | 2,100 | 2,750 | 3,750 |
| | 50 | 2,800 | 3,500 | 4,000 |

EXAMPLE 5

A copolymer of chloroprene and dichloroethene is prepared as follows:

95 parts of chloroprene, 5 parts of dichloroethene, 0.4 part of n-dodecylmercaptan, 0.1 part of phenthiazine are emulsified in 150 parts of water, 4 parts of the sodium salt of disproportionated abietic acid, 0.9 part of the sodium salt of naphthalenesulfonic acid condensed with formaldehyde, 0.9 part of NaOH and polymerization is initiated at 50° C. with the addition of 0.05 part of diazoacetic ester. After a yield of 80% is obtained, polymerization is stopped by cooling to room temperature and the mixture (reaction product) is degasified.

As compared with the pure polymer, the copolymer has the advantage of being sparingly crystallized, which property is welcome for a number of applications. In Table II, the Defo values of the above unvulcanized mixture on storage at room temperature of a copolymer are compiled, as compared with the pure polymer. It may be seen that the copolymer shows a slight tendency to hardening.

Table II
DEFO VALUES OF THE UNVULCANIZED MIXTURE

|  | Storage at room temperature after— | | |
|---|---|---|---|
|  | 0 days | 7 days | 14 days |
| Pure polymer | 900/18 | 5,500 | 7,500/33 |
| Copolymer containing 5% dichloroethane | 1,125/22 | 2,950/25 | 2,900/25 |

We claim:

1. In a process for the polymerization of chloroprene containing a stabilizer which has been added to inhibit polymerization of the chloroprene during its transport and storage, said stabilizer comprising 0.01–3% by weight of a rubber anti-oxidant selected from the group consisting of a polyhydric aromatic phenol, an aromatic amine, an alkylated phenol, a styrolized phenol, a bis-hydroxyphenyl methane which is alkylated in the phenyl nucleus, an amino phenol, a styrolized diphenylamine, and a phenothiazine, the presence of said anti-oxidant tending to adversely affect the subsequent polymerization of the chloroprene, the improvement comprising catalyzing the polymerization of the chloroprene by employing as a polymerization catalyst 0.005–2% by weight, based on the chloroprene, of a diazo compound of the general formula

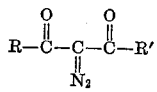

wherein R and R' stand for substituents selected from the group consisting of alkyl-, alkoxy, cycloalkoxy-, aralkoxy-, cycloalkyl-, aralkyl-, and aryl-radicals, and wherein in all radicals consisting of or containing alkyl radicals, the chain length of the alkyl group is up to 10 carbon atoms, the polymerization being conducted at a pH value of 7–12 and at a temperature of about 40–110° C.

2. Process of claim 1 wherein the polymerization is conducted in an aqueous dispersion at a pH of 9–12.

3. Process of claim 1 wherein the polymerization is conducted in an aqueous dispersion at a pH of 9–12 and a temperature of 40° C. until about 60–90% of the chloroprene is polymerized, after which the polymer is separated.

4. Process of claim 1 wherein the chloroprene is polymerized in the presence of about 0.1–2% by weight of a higher alkyl mercaptan.

5. Process of claim 1 wherein the polymerization catalyst is a lower alkyl ester of alpha-diazoaceto-acetic acid.

6. Process of claim 1 wherein the polymerization catalyst is diazo acetylacetone.

7. Process of claim 1 wherein the anti-oxidant is p-tert.butyl catechol.

8. In a process for the polymerization of chloroprene containing a stabilizer which has been added to inhibit polymerization of the chloroprene during its transport and storage, said stabilizer comprising 0.01–3% by weight of a rubber anti-oxidant selected from the group consisting of a polyhydric aromatic phenol, an aromatic amine, an alkylated phenol, a styrolized phenol, a bis-hydroxyphenyl methane which is alkylated in the phenyl nucleus, an amino phenol, a styrolized diphenylamine, and a phenothiazine, the presence of said anti-oxidant tending to adversely affect the subsequent polymerization of the chloroprene, the improvement comprising copolymerizing said stabilized chloroprene with a minor amount of an ethylenically unsaturated monomer copolymerizable therewith, in the presence of 0.005–2% by weight, based on the chloroprene, of a diazo polymerization catalyst of the general formula

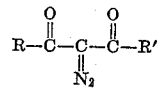

wherein R and R' stand for substituents selected from the group consisting of alkyl-, alkoxy-, cycloalkoxy-, aralkoxy-, cycloalkyl-, aralkyl-, and aryl-radicals, and wherein in all radicals consisting of or containing alkyl radicals, the chain length of the alkyl group is up to 10 carbon atoms, the polymerization being conducted at a pH value of 7–12 and at a temperature of about 40–110° C.

9. Process of claim 8 wherein said copolymerizable monomer is selected from the group consisting of a conjugated diene of 4–6 carbon atoms, a vinyl-substituted aromatic compound, vinylidene chloride, and esters of acrylic and methacrylic acid with lower monohydric saturated alcohols, said monomer being employed in an amount of 0.5–20% by weight, based on total monomers.

10. In a process for the polymerization of chloroprene containing 0.01–3%, based on the weight of chloroprene, of a rubber anti-oxidant which has been added for the purpose of inhibiting the premature polymerization of the chloroprene during its transport and storage, the presence of said anti-oxidant tending to adversely affect the subsequent polymerization of the chloroprene, the improvement comprising catalyzing the polymerization of the chloroprene by employing as a polymerization catalyst 0.005–2% by weight, based on the chloroprene, of a diazo compound of the general formula

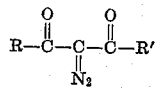

wherein R and R' stand for substituents selected from the group consisting of alkyl-, alkoxy-, cycloalkoxy-, aralkoxy-, cycloalkyl-, aralkyl-, and aryl-radicals, and wherein in all radicals consisting of or containing alkyl radicals, the chain length of the alkyl group is up to 10 carbon atoms, the polymerization being conducted at a pH value of 7–12 and at a temperature of about 40–110° C.

References Cited in the file of this patent
UNITED STATES PATENTS

| 2,376,963 | Garvey | May 29, 1945 |
| 2,600,454 | Wicklatz | June 17, 1952 |

OTHER REFERENCES

Fieser and Fieser, Organic Chemistry, 2d ed., Heath & Co., Boston, (1950), page 178.

Staudinger: Berichte, vol. 49 (1916), pp. 1184–97.

Schroeter: Berichte, vol. 49 (1916), pp. 2738.

Catton, The Neoprenes, E. I. du Pont de Nemours & Co., Inc., Wilmington, Del., pp. 1–3.